United States Patent [19]

Dotrong et al.

[11] Patent Number: 5,426,173
[45] Date of Patent: Jun. 20, 1995

[54] TWO-DIMENSIONAL BENZOBISOXAZOLE RIGID-ROD POLYMERS

[75] Inventors: My Dotrong; Minhhoa Dotrong, both of Beavercreek; Robert C. Evers, Dayton, all of Ohio

[73] Assignee: The United States of America as represented by the Secretary of the Air Force, Washington, D.C.

[21] Appl. No.: 282,092

[22] Filed: Jul. 18, 1994

[51] Int. Cl.⁶ .............................................. C08G 64/00
[52] U.S. Cl. .................. 528/370; 128/271; 128/403; 128/422; 128/425
[58] Field of Search ............... 528/370, 271, 403, 422, 528/425

[56] References Cited

U.S. PATENT DOCUMENTS

| | | | |
|---|---|---|---|
| 5,066,769 | 11/1991 | Evers et al. | 528/183 |
| 5,227,457 | 7/1993 | Marrocco, III et al. | 528/183 |
| 5,233,017 | 8/1993 | Dotrong et al. | 528/332 |
| 5,264,504 | 11/1993 | Evers et al. | 528/185 |

OTHER PUBLICATIONS

Article "Multi-dimensional benzobisoxazole rigid-rod polymers" pp. 408–409 from Polymer Preprints 34(2), Aug. 1993.
M. Dotrong, M. H. Dotrong and R. C. Evers, "Multi--dimensional Benzobisoxazole Polymers", Polymer Preprints, 34(2), Aug. 1993, pp. 408–409.

*Primary Examiner*—Paul R. Michl
*Assistant Examiner*—Duc Truong
*Attorney, Agent, or Firm*—Charles E. Bricker; Thomas L. Kundert

[57] ABSTRACT

A two-dimensional, rigid-rod polymer of the formula:

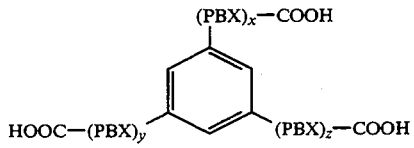

wherein x, y and z each has a value of 5 to 40; wherein the sum of x, y and z is about 20 to 100; and wherein PBX is a repeating group of the formula:

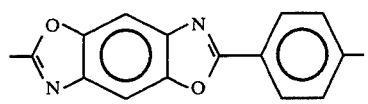

is prepared by the polycondensation of trimeric acid (TMA)

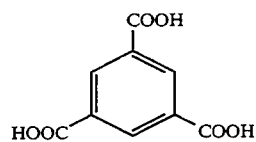

with 4-[5-amino-6-hydroxybenzoxazol-2-yl]benzoic acid (ABA)

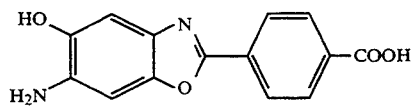

in polyphosphoric acid (PPA).

4 Claims, No Drawings

TWO-DIMENSIONAL BENZOBISOXAZOLE RIGID-ROD POLYMERS

RIGHTS OF THE GOVERNMENT

The invention described herein may be manufactured and used by or for the Government of the United States for all governmental purposes without the payment of any royalty.

BACKGROUND OF THE INVENTION

This invention relates to para-ordered aromatic heterocyclic polymers.

In general, the class of aromatic heterocyclic extended chain polymers are well known for their outstanding thermal, physical and chemical properties. Considerable research has been directed toward using poly(p-phenylene benzobisazole) polymers as the reinforcing elements in polymeric composites. These polymers, also known as rigid-rod polymers, have a high modulus and high strength, and can act as reinforcing elements similar to the reinforcement afforded by chopped fibers, but with the reinforcement taking place at the molecular level. Unfortunately, the low compressive strength of films and fibers made from these polymers have restricted their use in high-performance applications despite their excellent tensile properties, chemical resistance and thermooxidative stability.

Accordingly, it is an object of this invention to provide novel aromatic heterocyclic polymers having improved compressive strength properties.

Other objects and advantages of the invention will be apparent to those skilled in the art.

SUMMARY OF THE INVENTION

In accordance with the present invention, there is provided a two-dimensional, rigid-rod polymer of the formula:

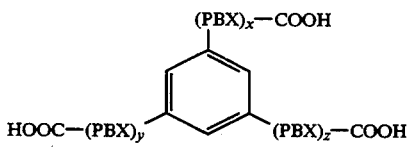

wherein x, y and z each has a value of 5 to 40; wherein the sum of x, y and z is about 20 to 100; and wherein PBX is a repeating group of the formula:

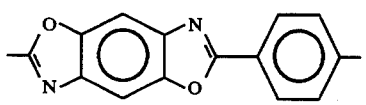

DETAILED DESCRIPTION OF THE INVENTION

The polymer I of this invention is prepared by the polycondensation of trimeric acid (TMA)

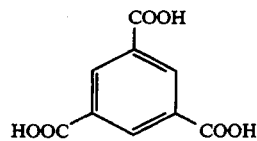

with 4-[5-amino-6-hydroxybenzoxazol-2-yl]benzoic acid (ABA)

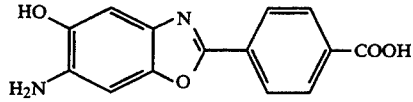

in polyphosphoric acid (PPA).

The following examples illustrate the invention. ABA was prepared according to literature procedures with minor modifications and stored at room temperature under a dry nitrogen atmosphere prior to use. All intermediate compounds were purified by recrystallization. Their purity was verified by high-performance liquid chromatography. TMA is commercially available; it was recrystallized from methanol prior to use.

EXAMPLE I

A mixture of 8.45 g of $P_2O_5$ and 5.54 g of 86.2% $H_3PO_4$ was stirred under reduced pressure at 100° C. until a homogeneous solution of 85.6% PPA resulted. To this cooled solution were added 2.675 g (9.90 mmol) of ABA and 0.021 g (0.1 mmol) of TEA. The viscous slurry was stirred under a stream of dry nitrogen for 2 hours at room temperature. The temperature was slowly increased to 100° C. over a period of 2 hours. After 18 hours at this temperature, stir opalexcence was observed in the voscous greenish-yellow solution. The reaction temperature was raised to 120° C. for one hur, 150° C. for one hour and then to 165° C. for 24 hours. The reaction mixture exhibited an intense persistent yellowish stir opalescence and became so viscous that stirring had little effect. The temperature was finally raised to 190° C. After 10 hours, the reaction mixture was poured into water and the precipitated polymer was vigorously stirred in a blender with water.

The resulting fibrous polymer was stirred in 5% $NH_4OH$ for 5 hours, then in distilled water for 2 hours. After being extracted with water for 24 hours and methanol for 24 hours in a continuous extraction apparatus, the polymer was dried at 100° C. in vacuo for two days. 2.3 g of golden-yellow polymer was obtained (98.5% yield). An intrinsic viscosity of 9.2 dl/g in methanesulfonic acid at 30° C. was recorded. The infrared spectrum of the polymer exhibited absorptions at 1527, 1558, 1491, 1414 and 1365 cm$^{-1}$. Elemental analysis: Calcd for $C_{1392}H_{597}N_{198}O_{198}$:C, 71.87; H, 2.59; N, 11.92. Found: C, 71.22; H, 2.53; N, 11.84.

EXAMPLE II

The procedure of Example I was repeated under varying mole ratios of ABA and TMA. The conditions and results of these polymerizations are shown in Table I, below. The homopolymerization of ABA carried out at 165° C. and 5% (w/w) polymer concentration (below the critical concentration) provided a polymer with an intrinsic viscosity of 3.0 dl/g (Trial No. 1). Increases in polymer reaction concentrations bove the critical concentration to 7 and 10% (Trial Nos. 2 and 3) led to intrinsic viscosities of 4.3 and 6.3 d./g, respectively. Stir opalescence indicative of the lyotropic nature of the polymer solutions was observed. Further improvements in the intrinsic viscosity to 10.4 and 13.8 dl/g (Nos. 4 and 5) were realized at 7 and 14% polymer concentrations, respectively, by extending the heating regime to 190° C. for 10 hours.

TABLE I

| | Trial No. | | | | | | | | |
|---|---|---|---|---|---|---|---|---|---|
| | 1 | 2 | 3 | 4 | 5 | 6 | 7 | 8 | 9 |
| ABA (mol %) | 100 | 100 | 100 | 100 | 100 | 95 | 95 | 98 | 99 |
| TMA (mol %) | 0 | 0 | 0 | 0 | 0 | 5 | 5 | 2 | 1 |
| Polymer Conc % (w/w) | 5 | 7 | 10 | 7 | 14 | 5 | 7 | 14 | 14 |
| Temp. (°C.) | 165 | 165 | 165 | 165/190 | 165/190 | 165 | 165 | 165/190 | 165/190 |
| Time (hours) | 24 | 24 | 24 | 24/10 | 24/10 | 24 | 24 | 24/10 | 24/10 |
| Stir Opalescence | No | Yes | Yes | Yes | Yes | No | No | Yes | Yes |
| [η] - dl/g in MSA at 30° C. | 3.0 | 4.3 | 6.3 | 10.4 | 13.8 | 0.9 | 1.1 | 6.3 | 9.2 |

Examination of the above data reveals that incorporation of the 1,3,5-phenyl core component into the rigid-rod polymer structure by polycondensation of TMA with ABA invariably led to lower polymer intrinsic viscosities than achieved by homopolymerization of ABA under identical reaction conditions.

The polymer of this invention may be used in place or together with other aromatic heterocyclic rigid-rod polymers.

Various modifications may be made to the invention as described without departing from the spirit of the invention or the scope of the appended claims.

We claim:

1. A two-dimensional, rigid-rod polymer of the formula:

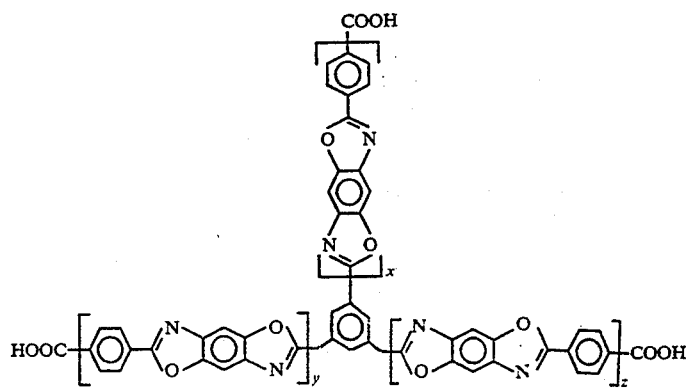

wherein x, y and z each has a value of 5 to 40 and wherein the sum of x, y and z is about 20 to 100.

2. The polymer of claim 1 wherein the sum of x, y and z is 99.

3. The polymer of claim 1 wherein the sum of x, y and z is 98.

4. The polymer of claim 1 wherein the sum of x, y and z is 95.

* * * * *

UNITED STATES PATENT AND TRADEMARK OFFICE
CERTIFICATE OF CORRECTION

PATENT NO. : 5,426,173
DATED : June 20, 1995
INVENTOR(S) : Dotrong et al.

It is certified that error appears in the above-indentified patent and that said Letters Patent is hereby corrected as shown below:

At column 2, line 32, "TEA" should read "TMA".

At column 3, line 3, "opalcscence" should read "opalescence".

Signed and Sealed this

Fourth Day of August, 1998

Attest:

BRUCE LEHMAN

Attesting Officer                Commissioner of Patents and Trademarks